Dec. 7, 1965 R. D. BREMER ETAL 3,221,396
METHOD OF FORMING A SOLID PLATE COOKING UNIT
Original Filed July 15, 1960 2 Sheets-Sheet 1

INVENTORS
Howard E. Van Scoyk
Robert D. Bremer
BY
*Frederick M. Ritchie*
Their Attorney Dec. 7, 1965  R. D. BREMER ETAL  3,221,396
METHOD OF FORMING A SOLID PLATE COOKING UNIT
Original Filed July 15, 1960  2 Sheets-Sheet 2
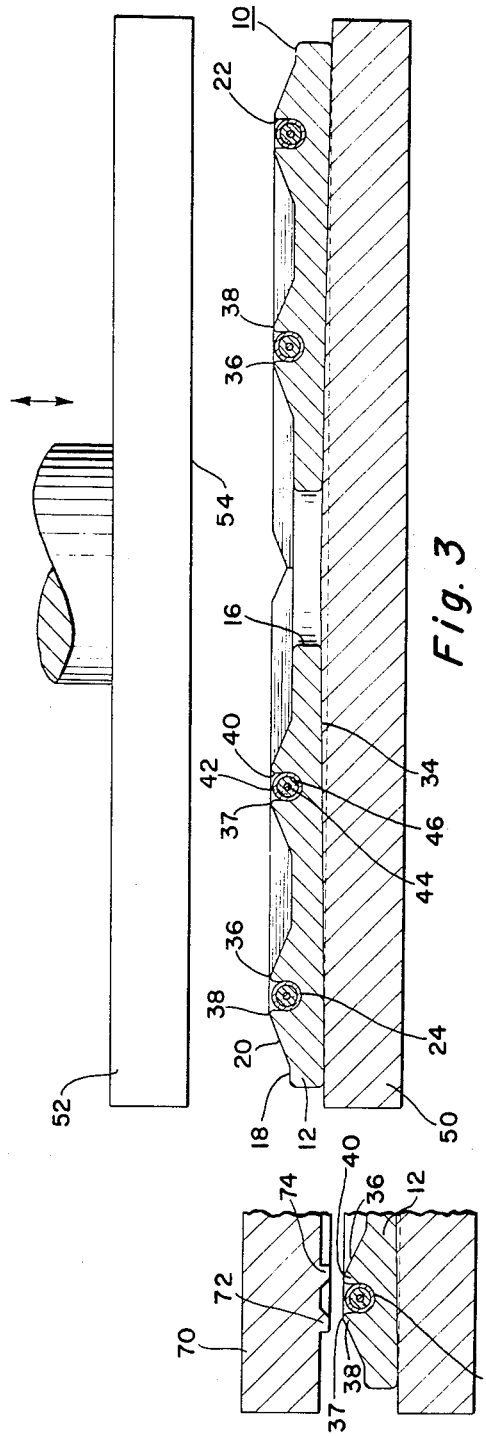
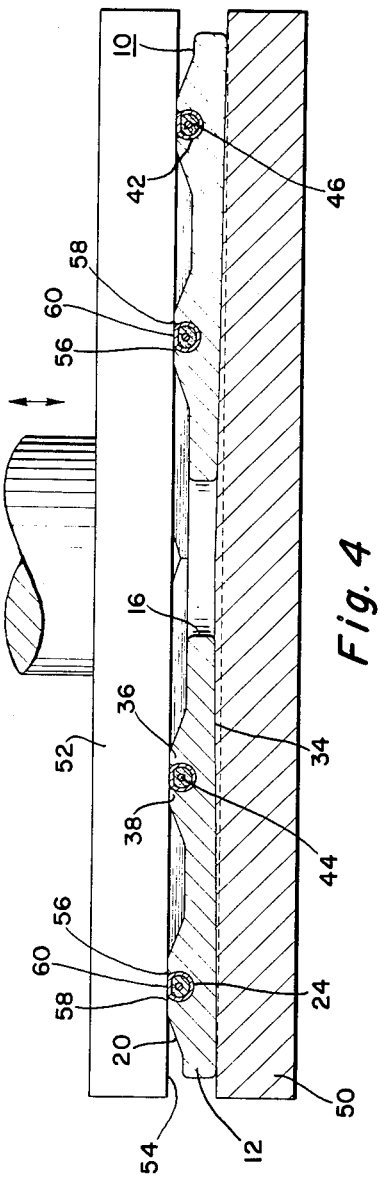
INVENTORS
Howard E. Van Scoyk
Robert D. Bremer
BY
Frederick M. Ritchie
Their Attorney

United States Patent Office 3,221,396
Patented Dec. 7, 1965

3,221,396
METHOD OF FORMING A SOLID PLATE
COOKING UNIT
Robert D. Bremer and Howard E. Van Scoyk, Dayton, Ohio, assignors to General Motors Corporation, Detroit, Mich., a corporation of Delaware
Original application July 15, 1960, Ser. No. 43,211, now Patent No. 3,110,796, dated Nov. 12, 1963. Divided and this application May 2, 1963, Ser. No. 277,538
4 Claims. (Cl. 29—155.5)

This invention relates to a domestic appliance and more particularly to an improved method of forming a solid plate cooking unit. This is a division of our copending application Serial No. 43,211 filed July 15, 1960, now Patent 3,110,796 issued November 12, 1963.

Solid plate cooking units have been recognized in the prior art especially for their even heat distribution and ease of cleaning. Disadvantages of such units are pointed up by the slowness of the cooking plate to heat up and to transmit heat to a cooking utensile. Although the spiral tubular sheathed heating elements provide rapid heat-up, they lack even heat distribution and the convolutions thereof are difficult to clean. This invention, then, is directed to a solid plate cooking unit wherein a tubular sheathed heating element is imbedded in intimate heat transfer relationship with a malleable or formable iron casting.

Accordingly, it is an object of this invention to provide a durable composite solid plate cooking unit in which the heating element therefor is press staked into intimate heat transfer relationship with a malleable iron casting.

It is a further object of this invention to provide a method of forming a solid plate cooking unit wherein the plate is cast and the tubular heating element formed in separate operations.

A more specific object of this invention is the provision of a solid plate cooking unit having a malleable iron casting portion and a sheathed tubular heating element retained in an irregular trough on the underside of said casting by staking the sides of said trough into intimate heat transfer relationship with said heating element.

Another object of this invention is the provision of a method of forming a solid plate cooking unit comprising the steps of, casting a quantity of malleable iron into a circular plate with an irregular trough or channel on one side thereof defined by integral ribs, placing a round tubular sheathed heating element in said trough, and pressing said ribs and said heating element into flattened intimate heat transfer relationship whereby said heating element is retained in said casting.

It is also an object of this invention to provide die forming apparatus for a solid plate cooking unit having a dished out top surface and a tubular sheathed heating element in an irregular rib-formed channel on the bottom surface thereof comprising, a bottom or lower die slightly conically shaped complementary to said dished-out surface for supporting said cooking unit and an upper die having a pair of depending irregular forming ribs complementary to and outlying said irregular channel ribs, whereby said channel ribs are forced inwardly when said upper die is brought into compressing relationship thereto.

Further objects and advantages of the present invention will be apparent from the following description, reference being had to the accompanying drawings wherein preferred embodiments of the present invention are clearly shown.

In the drawings:

FIGURE 3 is a sectional view of the die forming apparatus prior to compressing or press staking the heating element into retaining relationship with the cooking plate;

FIGURE 4 is a sectional view of the die forming apparatus in compressing relationship with the solid plate cooking unit—the section of the cooking unit being taken along line 3—3 in FIGURE 2; and FIGURE 5 is a fragmentary view of a modified die forming apparatus.

Figures 1, 2:
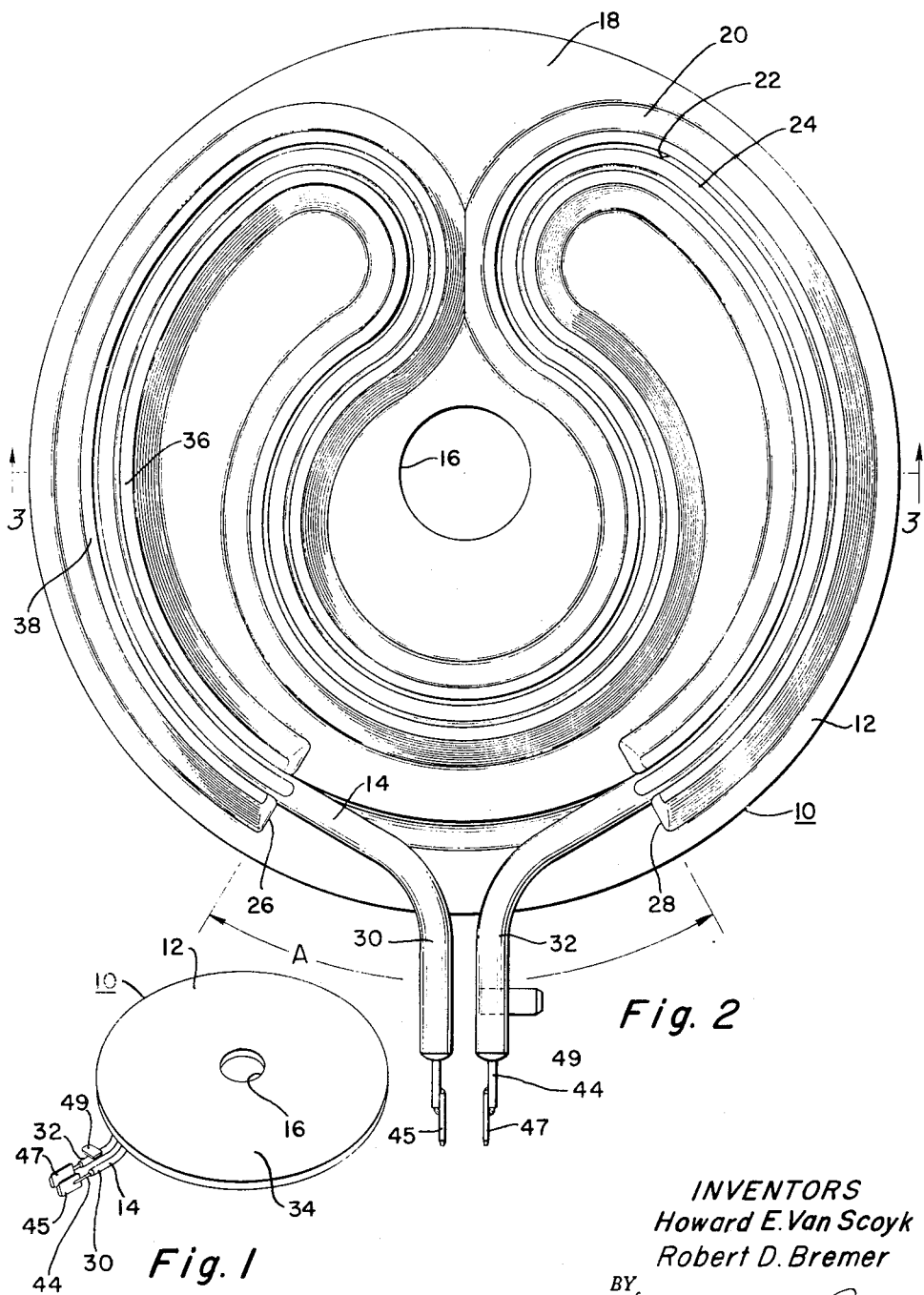
FIGURE 1 is a top perspective view of the cooking unit of this invention.
FIGURE 2 is a bottom elevational view.

In accordance with this invention and with reference to FIGURE 1 an improved solid plate cooking unit 10 is illustrated. The cooking unit is comprised of a circular casting 12 of malleable iron and a tubular sheathed heating element 14 secured to the underside thereof in intimate heat transfer relationship. The central portion of the plate 12 may be formed with an aperture 16 to permit the upward extension of a heat sensing element on on any conventional temperature responsive control currently available. If a thermally responsive cooking unit is not desired, the surface of the plate may be retained whole.

The reverse or bottom side 18 of the cooking unit 10 is shown in FIGURE 2. In this view the casting side 18 is formed with a meandering protuberance 20 which defines a central trough or channel 22 for receiving a complementary portion 24 of the heating element 14. Note that the protuberance may terminate at 26 and 28 at which point the terminal ends 30, 32 are offset downwardly away from the bottom 18 of the casting and carried to a point whereby they may be connected in any conventional fashion with a switching means. The sides of the casting trough are forced into closely adjacent gripping relationship with the contact portion 24 of the heating element to retain the casting and the heating element in closely bonded relationship as well as in efficient heat transfer relationship.

A complete description of the heating element 10 will now be given in connection with FIGURE 3, this sectional view being taken along the line 3—3 in FIGURE 2. The casting 12 is formed with a top side 34 which is dished out slightly conically (approximately .030 at the center of an 8" diameter casting) to prevent pan or utensil spin when the pan is resting on the top surface 34 of the cooking unit. The protuberance 20 on the bottom 18 of the casting is formed with a meandering inner rib 36 and an outer rib 38 in spaced parallel relationship thereto. These juxtaposed ribs 36 and 38 are spaced approximately .250 inch apart to form a trough 22 having a round or circular bottom which is complementary to the outer tubular configuration of the heating element portion 24. Of course, there will be sufficient tolerance in the trough 22 to permit the tubular heating element 14 to be placed easily within the confines of the ribs 36 and 38 before the press operation. The casting is approximately ¼ inch in thickness at its periphery and about .030 inch less in thickness at the center thereof. The top 37 of each rib 36, 38 is rounded off on a $\frac{1}{64}$-inch radius and each rib may terminate along an angle A (see FIGURE 2) of approximately 60°. This permits the terminal ends 30, 32 of the heating element 14 to be offset away from the bottom of the casting with a minimum of interference.

The heating element 14 is formed with an outer tubular sheath 42 surrounding a resistance element 44 imbedded in a mass of dielectric material such as magnesium oxide 46. Terminal connectors and spades 45, 47 are secured to facilitate switch connections. A spade 49 may be attached as by welding to the sheath 42 for grounding purposes. As the completed heating element or cooking unit 10 is formed, the ribs 36 and 38 are pressed into intimate relationship with tubular portions 24 of the heating element 14, the method for doing this being described next following.

In manufacturing the cooking unit 10 the first step is to make the tubular heating element 14. This may be accomplished in any suitable manner such as by the method taught in the copending application Serial No. 696,414, filed November 14, 1957, now Patent No. 3,082,-511, and assigned to the same assignee as the instant application. After the tubular sheath 42 is filled and compacted about the resistance element 44 with the dielectric substance 46, the heating element 14 is formed into the configuration shown in FIGURE 2.

In a separate operation which may be carried on in another area at the same time the casting 12 is formed of malleable iron. The central aperture 16, the dished-out top surface 34, and the ribs 36 and 38 are all formed during the casting process. Since the plate 12 is cast separately from the heating element 14, the casting alone can withstand rougher treatment than the prior art devices where the heating element and plate are cast together at the begininng of the manufacturing operation.

In the third step of this method, the formed heating element 14 is positioned in the meandering or irregular trough 22 on the underside 18 of the casting 12. Sufficient draft or tolerance is provided between the upstanding ribs 36 and 38 and the element 14 to permit easy entry of the heating element portion 24.

Next, the assembled casting and heating element are placed with the unit top surface 34 on a complementarily formed conical lower die 50. Of course it should be seen that if the surface 34 of the casting 12 is flat, a matching flat surface would be provided for the lower die. The upper die 52 is provided with a flat surface 54 thereon which is brought into engagement with the assembled casting and heating element—space being provided to receive the offset terminal ends 30, 32 of the heating element 14. Approximately 1000 tons of force is utilized to press the assembled cooking unit 10 into the configuration shown in FIGURE 4. Note that the tips 40, 37 of the ribs 36 and 38 are deformed inwardly or press-staked into overlying relationship (FIGURE 4) at 56 and 58 with the heating element portion 24. At the same time the bottom side of the tubular heating element is flattened as at 60 to compact further the magnesium oxide filler 46. The press staking operation will force the outer periphery of the heating element into intimate contact with the internal contour of the trough 22. In this manner the heating element and malleable casting are placed into intimate thermal or heat transfer relationship.

The press formed assembly is then roughened and cleaned on both surfaces by a shot-blasting process to prepare for a flame-spraying operation which enhances the appearance of the cooking unit and prevents undue corrosion of the exposed surfaces.

The flame-spraying is preceded by a preheating of the assembled plate and heating element to between 250° and 300° F. Corrosion resistant metal, such as aluminum, is then flame sprayed over the entire surface of the assembled cooking unit.

After the flame-spraying operation the assembled unit is placed in an ordinary air atmosphere furnace at 1700° F. for approximately two hours to diffuse the aluminum or other metal on the surface of the cooking unit. This diffusion process serves to complete the bond of the metal to the surfaces of the assembly and gives a harder, less porous finish.

Lastly, the flame sprayed and diffused assembly is wire brushed to remove excess residue and to impart a sheen which gives the finished cooking units a uniform appearance.

A rearrangement of the foregoing method steps provides for flame spraying the casting 12 before the plate and heating element are assembled. In this fashion soft aluminum is flame sprayed in the trough or groove 22 to give a better thermal bond and to protect the iron surfaces at the bottom of the groove. Thus when the heating element is assembled in the groove and the assembly is press staked in the dies, the heating element is imbedded more firmly in the soft aluminum coating sprayed on the inner portions of the groove. In this arrangement, the casting 12 alone need be cleaned by shot blasting in preparation for flame spraying. In rearranging the method steps of this invention it is important to recognize one fact; i.e. the press staking operation of the forming dies must be accomplished before diffusion. Whether the casting is flame sprayed before or after the heating element is assembled into the casting trough is immaterial insofar as the flame spraying is concerned. But the diffusion which follows the flame spraying must be subsequent to the press forming operation in order to prevent the malleability of the casting from being impaired.

It is also within the purview of this invention to eliminate the diffusion step. It is recognized that the metal flame sprayed on the surfaces of the cooking unit will be less completely bonded without the diffusion process, but it is believed that the cooking unit would be as efficient with or without diffusion.

Another embodiment of this invention is shown in FIGURE 5 wherein a top die 70 is formed with a meandering rib 72 slightly radially outside of the casting rib 38 and a rib 74 slightly radially inwardly of the casting rib 36. With this arrangement the pressing action of the die 70 against the ribs 36 and 38 will improve the crushing action whereby the terminal ends 40, 37 of the ribs 36 and 38 are forced into intimate overlying and retaining relationship with the heating element 14.

It should now be seen that an improved cooking unit 10 is provided wherein the casting of the plate unit is accomplished in a separate operation from the formation of the tubular sheathed heating element. The methods of this invention provide for an intimate thermal heat transfer bond between the heating element and the casting by providing for a malleable cast unit which may be pressed into tightly fitting engagement with the heating element. This malleable casting is less susceptible to operational warping than plates made heretofore with hot rolled steel. Further, the surface area for a heating element, such as 14, used in the cooking unit 10 may be lower for a given wattage input to the heating element 14. This is made possible since the heat is carried away from the heating element 14 more quickly by the substantially surrounding casting plate 12 than from the spirally-wound, open coil cooking units in common use today.

While the embodiments of the present invention as herein disclosed, constitute preferred forms, it is to be understood that other forms might be adopted.

What is claimed is as follows:

1. A method of forming a solid plate cooking unit comprising the sequential steps of, casting a malleable iron plate with upstanding ribs on one side thereof to form a trough having a configured bottom, placing a tubular metal sheathed heating element of substantially the same configuration as the bottom of said trough within said trough, pressing the terminal ends of said ribs into deformed partially overlapping relationship to said heating element while simultaneously flattening the exposed side of said heating element, shot-blasting the assembled plate and heating element, preheating the assembled plate and heating element to between 250° F. and 300° F., flame-spraying a corrosion resistant metallic coating which is capable of diffusing at approximately 1700° F. over the assembled plate and heating element, and diffusing the metallic coating on the assembled plate and heating element in an ordinary air atmosphere furnace at approximately 1700° F.

2. A method of forming a solid plate cooking unit comprising the sequential steps of, casting a malleable iron plate with upstanding ribs on one side thereof to form a trough having a configured bottom, shot-blasting said plate, preheating said plate to between 250° F. and 300°

F., flame-spraying a corrosion resistant metallic coating which is capable of diffusing at approximately 1700° F. over said plate, placing a tubular metal sheathed heating element of substantially the same configuration as the bottom of said trough within said trough, pressing the terminal ends of said ribs into deformed partially overlapping relationship to said heating element while simultaneously flattening the exposed side of said heating element, and diffusing the metallic coating on the assembled plate and heating element in an ordinary air atmosphere furnace at approximately 1700° F.

3. A method of forming a solid plate cooking unit comprising the sequential steps of, casting a malleable iron plate with upstanding ribs on one side thereof to form a trough having a configured bottom, placing a tubular metal sheathed heating element of substantially the same configuration as the bottom of said trough within said trough, pressing the terminal ends of said ribs into deformed partially overlapping relationship to said heating element while simultaneously flattening the exposed side of said heating element, shot-blasting the assembled plate and heating element, preheating the assembled plate and heating element to between 250° F. and 300° F., flame-spraying a corrosion resistant metallic coating which is capable of diffusing at approximately 1700° F. over the assembled plate and heating element, diffusing the metallic coating on the assembled plate and heating element in an ordinary air atmosphere furnace at approximately 1700° F., and wire brushing the plate after the diffusion to impart a sheen to said cooking unit.

4. A method of forming a solid plate cooking unit comprising the sequential steps of, casting a malleable iron plate with upstanding ribs on one side thereof to form a trough having a configured bottom, shot-blasting said plate, preheating said plate to between 250° F. and 300° F., flame-spraying a metallic aluminum coating over said plate and in said trough, placing a tubular metal sheathed heating element of substantially the same configuration as the bottom of said trough within said trough, pressing the terminal ends of said ribs into deformed partially overlapping relationship to said heating element while simultaneously flattening the exposed side of said heating element, and diffusing the metallic aluminum coating on the assembled plate and heating element in an ordinary air atmosphere furnace at approximately 1700° F., whereby an improved thermal bond is effected between said heating element and said plate by the aluminum coating in said trough.

References Cited by the Examiner

UNITED STATES PATENTS

| | | | |
|---|---|---|---|
| 2,706,766 | 4/1955 | Huffman | 219—25 |
| 2,875,312 | 2/1959 | Norton | 29—155.5 |
| 3,090,118 | 5/1963 | Hanzel | 219—44 |

OTHER REFERENCES

Metco Metallizing Handbook, published by Metallizing Engineering Co., Inc., © 1959, page 110.

WHITMORE A. WILTZ, *Primary Examiner.*

JOHN F. CAMPBELL, *Examiner.*